(12) United States Patent
Slocum et al.

(10) Patent No.: US 11,161,579 B2
(45) Date of Patent: Nov. 2, 2021

(54) SYSTEMS, MODULES, AND SUBMERSIBLE VEHICLES FOR COLLECTING MATERIAL FROM A SEAFLOOR

(71) Applicant: LTAG SYSTEMS LLC, Bow, NH (US)

(72) Inventors: Alexander H. Slocum, Bow, NH (US); Jonathan T. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 17/340,769

(22) Filed: Jun. 7, 2021

(65) Prior Publication Data

US 2021/0291947 A1    Sep. 23, 2021

Related U.S. Application Data

(63) Continuation of application No. PCT/US2020/064953, filed on Dec. 14, 2020.

(60) Provisional application No. 62/947,003, filed on Dec. 12, 2019.

(51) Int. Cl.
*B63G 8/08* (2006.01)
*B63C 11/52* (2006.01)
(Continued)

(52) U.S. Cl.
CPC .................. *B63G 8/04* (2013.01); *B60L 1/00* (2013.01); *B60L 50/70* (2019.02); *B63C 11/52* (2013.01);
(Continued)

(58) Field of Classification Search
CPC .......... B60L 50/70; B63H 1/14; B63C 11/52; H01M 8/04753; H01M 8/04201;
(Continued)

(56) References Cited

U.S. PATENT DOCUMENTS 4,280,288 A    7/1981  Corfa et al.
4,446,636 A    5/1984  Weinert
(Continued)

FOREIGN PATENT DOCUMENTS

EP    2980352 A1    2/2016
WO    2015005921 A1    1/2015
(Continued)

OTHER PUBLICATIONS

International Search Report and Written Opinion; International Application No. PCT/US2020/064953; ISA European Patent Office; dated May 25, 2021. (18 pages).
(Continued)

*Primary Examiner* — Anthony D Wiest
(74) *Attorney, Agent, or Firm* — The Marbury Law Group, PLLC

(57) ABSTRACT

A submersible vehicle for collecting material from a seafloor includes a chassis. A module may be supported on the chassis, the module including an electric power supply. A drive system may be supported on the chassis, the drive system including a battery, and a propulsion assembly, the battery in electrical communication with the electric power supply and the propulsion assembly, and the propulsion assembly operable to locate the chassis relative to a seafloor. A power tool may be coupled to the chassis, the power tool operable to collect material from the seafloor. A reactor may be supported on the chassis, the reactor defining a reaction chamber. A valve assembly may be actuatable to move a hydrogen-containing gas from the reaction chamber and direct the hydrogen-containing gas to one or more of the electric power supply or the power tool.

22 Claims, 7 Drawing Sheets

(51) Int. Cl.
  *B60L 50/70* (2019.01)
  *B63H 1/14* (2006.01)
  *H01M 8/04082* (2016.01)
  *H01M 8/04746* (2016.01)
  *H01M 8/04992* (2016.01)
  *B63G 8/14* (2006.01)
  *B63G 8/00* (2006.01)
  *B63G 8/04* (2006.01)
  *B60L 1/00* (2006.01)

(52) U.S. Cl.
  CPC ............ *B63G 8/08* (2013.01); *B63G 8/14* (2013.01); *B63H 1/14* (2013.01); *H01M 8/04201* (2013.01); *H01M 8/04753* (2013.01); *H01M 8/04992* (2013.01); *B63G 8/001* (2013.01); *B63G 2008/004* (2013.01); *H01M 2250/20* (2013.01)

(58) Field of Classification Search
  CPC ..... H01M 2250/20; B63G 8/08; B63G 8/001; B63G 2008/004
  USPC ................ 114/312, 313, 330, 331, 337, 338
  See application file for complete search history.

(56) References Cited

U.S. PATENT DOCUMENTS

| | | | |
|---|---|---|---|
| 5,372,617 A * | 12/1994 | Kerrebrock | H01M 8/065 48/61 |
| 6,506,360 B1 | 1/2003 | Andersen et al. | |
| 8,418,435 B2 | 4/2013 | Hatoum | |
| 8,697,027 B2 * | 4/2014 | Uzhinsky | H01M 8/065 423/648.1 |
| 10,745,789 B2 | 8/2020 | Slocum | |
| 2002/0088178 A1 | 7/2002 | Davis | |
| 2008/0193806 A1 | 8/2008 | Kulakov | |
| 2010/0028255 A1 | 2/2010 | Hatoum | |
| 2010/0112396 A1 | 5/2010 | Goldstein | |
| 2012/0100443 A1 | 4/2012 | Braithwaite et al. | |
| 2012/0107228 A1 | 5/2012 | Ishida et al. | |
| 2015/0204486 A1 | 7/2015 | Hoffman | |
| 2016/0355918 A1 | 12/2016 | Slocum | |
| 2019/0341637 A1 | 11/2019 | Fine et al. | |
| 2020/0199727 A1 | 6/2020 | Slocum | |
| 2021/0115547 A1 | 4/2021 | Slocum | |

FOREIGN PATENT DOCUMENTS

| | | |
|---|---|---|
| WO | 20150077225 A1 | 5/2015 |
| WO | 2016196718 A1 | 12/2016 |
| WO | 2021119628 A1 | 6/2021 |

OTHER PUBLICATIONS

EPO, "EP Application Serial No. 16804381.8, Extended European Search Report dated Oct. 26, 2018", 7 pages.

WIPO, "PCT Application No. PCT/US16/35397, International Preliminary Report on Patentability dated Dec. 5, 2017", 11 pages.

ISA, "PCT Application No. PCT/US16/35397, International Search Report and Written Opinion dated Sep. 7, 2016", 13 pages.

* cited by examiner

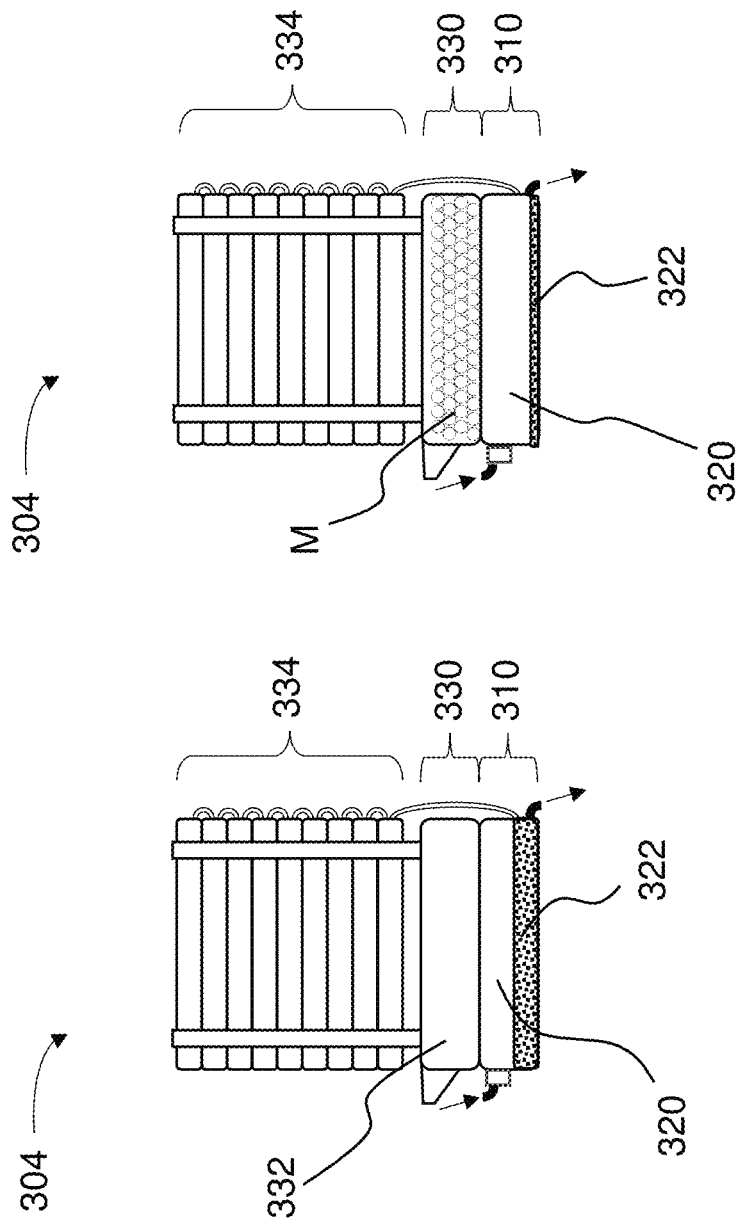

SYSTEMS, MODULES, AND SUBMERSIBLE VEHICLES FOR COLLECTING MATERIAL FROM A SEAFLOOR

CROSS-REFERENCE TO RELATED APPLICATIONS

This application is a continuation of International Patent Application No. PCT/US2020/064953, filed Dec. 14, 2020, which claims the benefit of priority to U.S. Provisional Patent Application No. 62/947,003, filed on Dec. 12, 2019, with the entire contents of each of these applications hereby incorporated herein by reference.

BACKGROUND

In deep-sea mining, unmanned vehicles are submerged to a seafloor and operate, either autonomously or through remote control, to collect ore-containing material from a seafloor. The commercial viability of deep-sea mining in collecting such ore-containing material, however, is significantly impacted by the cost associated with operating an unmanned vehicle for long periods of mining underwater. That is, submerging and lifting an unmanned vehicle to and from a mining location on the seafloor is time-consuming, expensive, and energy intensive. Further, while large and complex machinery for deep-sea mining may require fewer submersion/lifting cycles per unit mass of ore-containing material collected, such machinery can create plumes of sediment with the potential to destroy delicate underwater environments and life with unknown consequences. Accordingly, there remains a need for unmanned vehicles that are environmentally compatible and can be operated on the seafloor for long periods of time to mine commercial-scale quantities of ore-containing material.

SUMMARY

According to one aspect, a submersible vehicle may include a chassis, a module supported on the chassis, the module including an electric power supply, a drive system supported on the chassis, the drive system including a battery, and a propulsion assembly, the battery in electrical communication with the electric power supply and the propulsion assembly, and the propulsion assembly operable to locate the chassis relative to a seafloor, a power tool coupled to the chassis, the power tool operable to collect material from the seafloor, a reactor supported on the chassis, the reactor defining a reaction chamber, and a valve assembly actuatable to move a hydrogen-containing gas from the reaction chamber and direct the hydrogen-containing gas to one or more of the electric power supply or the power tool.

In certain implementations, the electric power supply may include a chemical battery. Additionally, or alternatively, the submersible vehicle may further include an oxygen supply, and the electric power supply may include a fuel cell arranged to receive oxygen from the oxygen supply. For example, the valve assembly may be arranged to direct at least a portion of the hydrogen-containing gas to the fuel cell. Further, or instead, the valve assembly may be arranged to direct at least a portion of the hydrogen-containing gas to the power tool. The oxygen supply may include, for example, an oxygen candle.

In some implementations, the power tool may include power electronics and electric actuators in electrical communication with the electric power supply of the module.

In certain implementations, the valve assembly may be arranged to direct at least a portion of the hydrogen-containing gas to the to the electric power supply via the power tool. In some instances, the power tool may include an accumulator, one or more pneumatic actuator, and an end-effector. For example, the valve assembly may be actuatable to direct at least a portion of the hydrogen-containing gas from the reaction chamber to the accumulator, and each of the one or more pneumatic actuators is actuatable, via the hydrogen-containing gas from the accumulator, from a first position to a second position to move the end-effector. Additionally, or alternatively, each pneumatic actuator may be retractable from the second position to the first position, and at least a portion of the hydrogen-containing gas is movable to the module via retraction of each pneumatic actuator from the second position to the first position.

In some implementations, the reactor includes an inlet valve actuatable to control a flow of seawater into the reaction chamber.

In certain implementations, the propulsion assembly may include one or more of a wheel-driven track set or a propeller.

In some implementations, the module may include a container defining a payload volume, and the power tool is operable to move material from the seafloor into the payload volume. The module may further, or instead, include a lift structure defining a buoyancy volume, wherein the valve assembly is actuatable to direct at least a portion of the hydrogen-containing gas into the buoyancy volume from the reaction chamber, the power tool, or both. In some cases, at least a portion of the lift structure may be flexible to expand as pressure of hydrogen-containing gas therein changes with decreasing depth as buoyancy of the lift structure raises the module alone or in combination with one or more of the chassis, the drive system, or the power tool. Additionally, or alternatively, the module may include a control valve in fluid communication with the buoyancy volume and actuatable, at a predetermined threshold pressure, to release at least a portion of the hydrogen-containing gas from the lift structure as pressure in the buoyancy volume increases with decreasing depth of the lift structure. Further, or instead, at least a portion of the lift structure may be rigid to a predetermined depth associated with a mission of the submersible vehicle. For example, at least a portion of the lift structure may include carbon fiber.

In some implementations, the submersible vehicle may further include a controller including a processing unit and a non-transitory computer-readable storage media having stored thereon computer-readable instructions for causing the processing unit to perform operations including actuating the valve assembly to direct the hydrogen-containing gas to the lift structure, determining an inflation state of the lift structure, and releasing the module from the chassis based on the inflation state of the lift structure. For example, actuating the valve assembly to direct the hydrogen-containing gas to the lift structure may be based one or more of time, an amount of material in the payload volume, or an amount of water-reactive aluminum carried by the reactor. As another example, releasing the module may be further based on an amount of unreacted activated aluminum in the reaction chamber. The controller may further, or instead, have stored thereon computer-readable instructions for causing the processing unit to perform operations further including releasing the reactor from the chassis along the seafloor to lift the module, the chassis, the drive system, and the power tool from the seafloor with the lift structure in an inflated state.

According to another aspect, a module for collecting material from a seafloor may include a container defining a payload volume, a lift structure coupled to the container, the lift structure defining a buoyancy volume, a reactor coupled to the container, the reactor defining a reaction chamber in fluid communication with the buoyancy volume, and an inlet valve in fluid communication with the reaction chamber, the inlet valve actuatable to introduce seawater into the reaction chamber in response to a command to fill the buoyancy volume, in fluid communication with the reaction chamber, with a lifting gas.

In certain implementations, the container may define an opening to receive material, from a submersible vehicle, into the payload volume.

In some implementations, the reactor may be releasable from the container and the lift structure based on a state of inflation of the buoyancy volume.

In certain implementations, the buoyancy volume may includes a plurality of discrete volumes distributed about the container.

In some implementations, the lift structure defining the buoyancy volume may include at least one tank, and each tank is rigid to a predetermined depth of water.

According to yet another aspect, a system may include a surface ship including a power plant operable using hydrogen, and a plurality of modules carried on the surface ship, each module submersible to a seafloor. Each module may include a container defining a payload volume, at least one tank coupled to the container, a reactor coupled to the container, the reactor defining a reaction chamber in fluid communication with the at least one tank, and activated aluminum disposed in the reaction chamber. The activated aluminum may be reactive with seawater in the reaction chamber to fill the at least one tank with a hydrogen-containing gas, each module may be retrievable by the surface ship with the payload volume laden with material and the at least one tank containing the hydrogen-containing gas, and the at least one tank of each of the plurality of modules may be connectable in fluid communication with the power plant of the surface ship.

In certain implementations, the system may further include a submersible vehicle including a chassis, and a drive assembly, wherein the drive assembly is carried on the chassis, at least one module of the plurality of modules is releasably engageable with the chassis such that the drive assembly is operable with energy from the hydrogen-containing gas in one or more of the reaction chamber or the at least one tank of the at least one module, the drive assembly of the submersible vehicle is operable, and the drive assembly is controllable to locate the submersible vehicle along a seafloor.

In certain implementations, the system may further include a power tool coupled to the chassis, wherein the power tool is operable to collect material from the seafloor and place the material in the payload volume of the at least one module of the plurality of modules when the at least one module of the plurality of modules is releasably engaged to the chassis. For example, the power tool may include an accumulator, one or more pneumatic actuator, and an end-effector, the accumulator is arranged receive least a portion of the hydrogen-containing gas from the at least one module, and each of the one or more pneumatic actuators is actuatable, via the hydrogen-containing gas from the accumulator, from a first position to a second position to move the end-effector. Additionally, or alternatively, each pneumatic actuator may be retractable from the second position to the first position, and at least a portion of the hydrogen-containing gas is movable to the at least one tank of the at least one module via retraction of each pneumatic actuator from the second position to the first position.

BRIEF DESCRIPTION OF THE FIGURES

FIG. 3C is a side view of a module of the system of FIG. 3A, the module shown in a condition of deployment in FIG. 3A with a payload volume empty and a reaction chamber full of activated aluminum.

FIG. 3D is a side view of the module of FIG. 3C, the module shown in a condition of retrieval in FIG. 3B with the payload volume laden with material collected from the seafloor by the submersible vehicle of FIGS. 3A and 3B, and the reaction chamber substantially depleted of activated aluminum.

Like reference symbols in the various drawings indicate like elements.

DETAILED DESCRIPTION

Figure 1A:
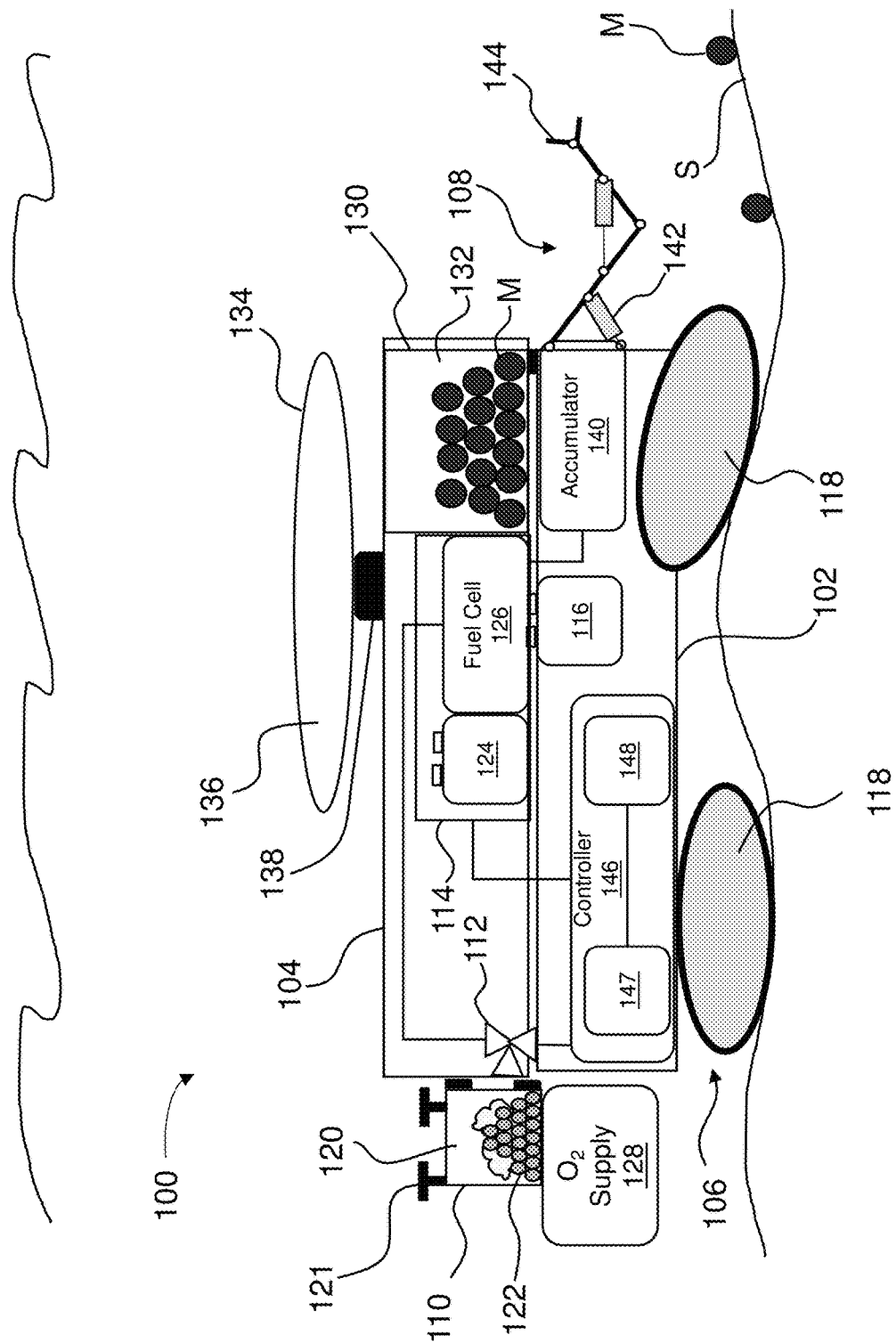
FIG. 1A is a schematic representation of a submersible vehicle including a module, a reaction chamber, a power tool, and a valve assembly, with the valve assembly actuatable to move a hydrogen-containing gas from the reaction chamber and direct the hydrogen-containing gas to one or more of the power tool, an electric power supply, or lifting structure of the module.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

As used herein, the terms "activated aluminum," "aluminum in an activated form," and "water-reactive aluminum" shall be understood to be interchangeable with one another, unless otherwise specified or made clear from the context, with the different terms being used as appropriate to facilitate readability in different contexts. Further, unless a contrary intent is indicated, each of these terms shall be understood to include any manner and form of aluminum that may produce hydrogen upon exposure to water, with or without the addition of additional materials. Some examples of activated aluminum useable herein are set forth in U.S. Pat. No. 10,745,789, issued to Jonathan Thurston Slocum on Aug. 18, 2020, and entitled "Activated Aluminum Fuel," the entire contents of which are hereby incorporated herein.

As used herein, unless otherwise specified or made clear from the context, the term "coupled" shall be understood to include elements that are mechanically attached to one another in any manner and form, whether in a fixed orientation or with limited movement (e.g., rotatable or extendible) relative to one another while mechanically attached to one another. Thus, for example, elements that are attached to one another in a fixed orientation and in direct contact with one another shall be understood to be coupled to one another. Further, or instead, elements having limited movement relative to one another (e.g., magnetically attached) shall be understood to be coupled to one another, whether or not such elements are directly in contact with one another. That is, in all cases, elements shall be understood to be coupled to one another, even if there are one or more intervening elements, as long as such elements have a fixed orientation or at least partially limited movement relative to one another. Thus, for example, elements that are supported by and/or coupled to a chassis shall be understood to be coupled to one another, via the chassis, in the present disclosure, unless a contrary intent is indicated.

Further, as used herein, the term "hydrogen-containing gas" shall be understood to include any gas having a hydrogen component of greater than about 50 percent on a dry volume basis (e.g., greater than about 80 or 90 percent) and may include pure hydrogen. Thus, for example, a hydrogen-containing gas formed from the reaction of activated aluminum and seawater as described herein may include certain impurities, such as may be introduced into a reaction chamber by seawater used in the reaction and/or additives (e.g., powdered urine, coffee, acid, or a combination thereof) added to the seawater to facilitate reacting the seawater with the activated aluminum. Further, or instead, it shall be understood that the hydrogen-containing gas formed from the reaction of activated aluminum and seawater may be filtered or otherwise treated to remove at least a portion of the impurities at any one or more of the various different points of use of the hydrogen-containing gas. Thus, unless otherwise indicated or made clear from the context, it shall be understood that the terms hydrogen and hydrogen-containing gas may be used interchangeably with one another.

In the description that follows, elements having numbers with the same last two digits should be understood to be analogous to or interchangeable with one another, unless otherwise explicitly made clear from the context. Accordingly, to avoid repetition, such similarly numbered elements are not described separately from one another, except to note differences or emphasize certain features. Thus, for example, the activated aluminum 122 in FIG. 1A shall be understood to be analogous to the activated aluminum 222 in FIG. 2A, unless otherwise specified or made clear from the context.

Further, unless otherwise specified or made clear from the context, it shall be appreciated that any one or more of the various different submersible vehicles described herein may be remotely operated underwater vehicles or autonomous underwater vehicles. For the sake of clear and efficient explanation, these are generally not described separately herein.

Figure 1B:
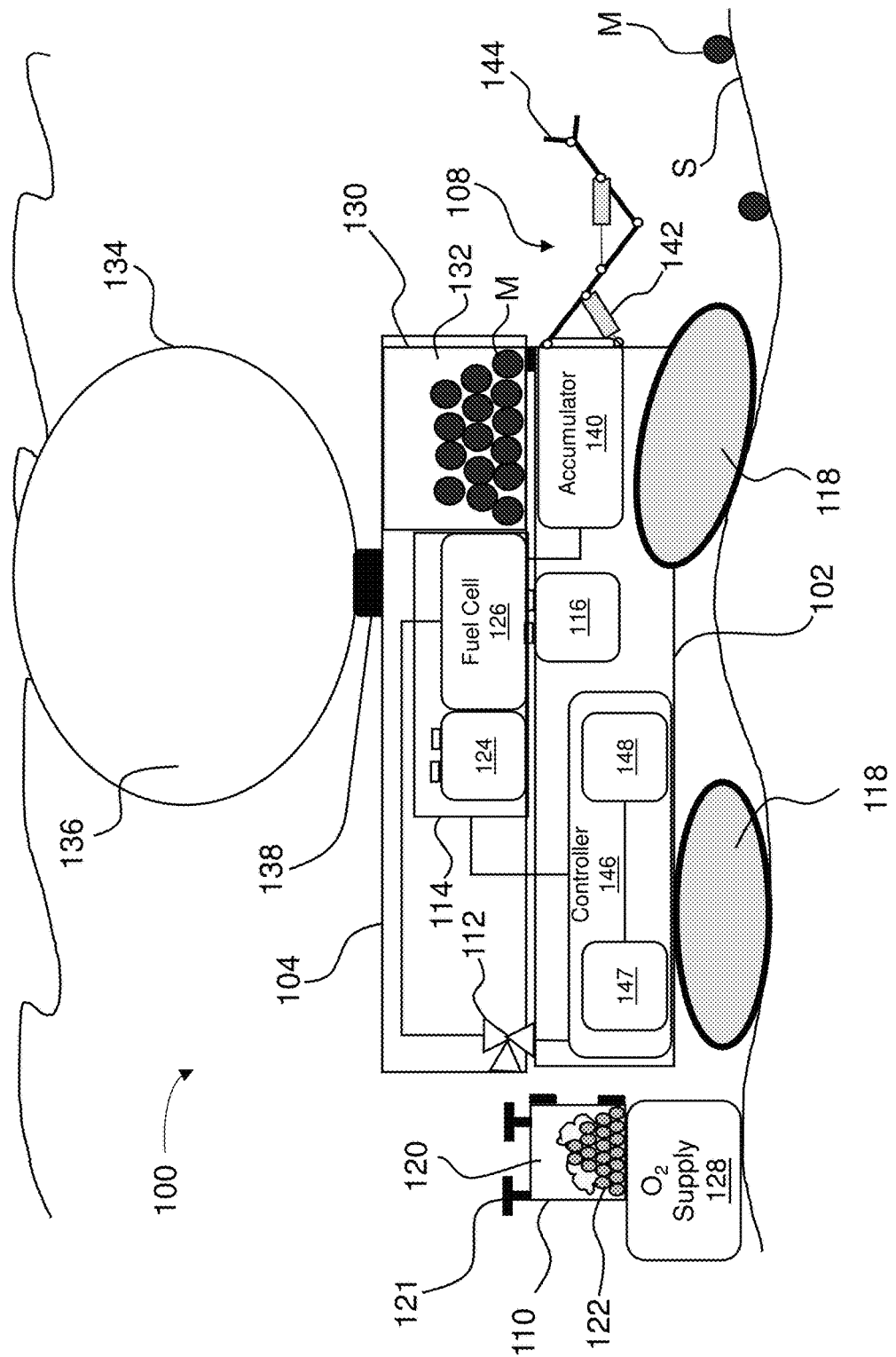
FIG. 1B is a schematic representation of the submersible vehicle of FIG. 1A shown with the reaction chamber jettisoned, the module detached, and a lifting structure of the module filled with a hydrogen-containing gas.

Referring now to FIGS. 1A and 1B, a submersible vehicle 100 may include a chassis 102, a module 104, a drive system 106, a power tool 108, a reactor 110, and a valve assembly 112. The module 104 may be supported on the chassis 102 and may include an electric power supply 114. The drive system 106 may be additionally, or alternatively, supported on the chassis, and may include a battery 116 and a propulsion system 118. The propulsion system 118 may be generally operable to locate the chassis 102—and thus the submersible vehicle 100—relative to a seafloor S. The power tool 108 may be coupled to the chassis 102 and operable to collect material (e.g., ore-containing material) from the seafloor S.

The reactor 110 may define a reaction chamber 120 that, in use, may contain activated aluminum 122. For example, the reactor 110 may include an inlet valve 121 actuatable to control a flow of seawater into the reaction chamber 120, where the activated aluminum 122 may reacted with the seawater to produce heat and hydrogen-containing gas in a reaction that—importantly for deep-sea applications—is not quenched by pressure. Accordingly, as described in greater detail below, the reaction of activated aluminum 122 in the reaction chamber 120 may produce pressurized hydrogen useful for providing various different forms of energy useable by the submersible vehicle 100 to carry out one or more aspects of a deep-sea mining operation with efficiencies that, as compared to other techniques for powering and/or lifting deep-sea vehicles, tethers, facilitate more cost-effective collection of industrial quantities of material from the seafloor S. Further, or instead, as also described in greater detail below, the use of pressurized hydrogen formed from the activated aluminum 122 in the reaction chamber 120 may be amenable to modularization of the submersible vehicle 100, with such modularization being useful for achieving long periods of bottom surface operation of the submersible vehicle 100 while having an operating footprint that is compatible with the environment being mined. Still further, the use of the activated aluminum 122 as a source of pressurized hydrogen for the submersible vehicle 100 may facilitate achieving efficient use of weight which, in turn, may represent cost savings.

The valve assembly 112 may, in general, include any one or more of various different arrangements of valves and/or conduits actuatable to move the hydrogen-containing gas from the reactor 110 to one or more portions of the submersible vehicle 100 to make use of various different forms of energy of the hydrogen-containing gas generated in the reactor 110 while the submersible vehicle 100 is submerged (e.g., along the seafloor S). Various aspects of such actuation of the valve assembly 112 to make use of energy in the hydrogen-containing gas are described below and include, but are not limited to: (1) actuation of the valve assembly 112 to direct hydrogen-containing gas to the electric power supply 114; (2) actuation of the valve assembly 112 to direct hydrogen-containing gas to lift the module 104 alone or with the rest of the submersible vehicle 100; and (3) actuation of the valve assembly 112 to direct pressurized hydrogen-containing gas to actuate the power tool pneumatically. While actuation of the valve assembly 112 to make the foregoing beneficial uses of the hydrogen-containing gas are described together in the discussion that follows, it shall be appreciated that this is for the sake of clear and efficient description and in furtherance of describing various synergies that may exist with respect to combinations of the foregoing uses of hydrogen-containing gas. However, unless otherwise specified or made clear from the context, it shall be appreciated that the valve assembly 112 may be arranged to direct the hydrogen-containing gas along any one or more of various different portions of the submersible vehicle 100 as may be useful for realizing any one of the foregoing advantages individually or in combination with one another, without departing from the scope of the present disclosure.

In general, the module 104 may provide power from the electric power supply 114 to any one or more of various different electrically powered systems, subsystems, or components of the submersible vehicle 100. For example, the electric power supply 114 may include a chemical battery 124, which may include a plurality of electrochemical cells arranged as a battery-pack (e.g., lithium-ion batteries). In some cases, the chemical battery 124 may be sized to provide power throughout an intended mission of the submersible vehicle 100 such that the chemical battery may be recharged only at the surface, between deployments of the module 104.

In certain implementations, the chemical battery 124 may be additionally, or alternatively, rechargeable while the module 104 is submerged. As an example, the electric power supply 114 of the module 104 may additionally, or alternatively, include a fuel cell 126 in electrical communication with the chemical battery 124 to charge the chemical battery 124 while the submersible vehicle 100 is deployed. More specifically, the valve assembly 112 may be arranged to direct at least a portion of the hydrogen-containing gas to the fuel cell 126 from any one or more of various different portions of the gas circuit onboard the submersible vehicle 100. Thus, in some cases, the valve assembly 112 may be arranged to direct the hydrogen-containing gas from the reaction chamber 120 to the fuel cell 126. Such flow of the hydrogen-containing gas may be directly from the reaction chamber 120 in some instances or, as described in greater detail below, following use of the hydrogen-containing gas to pneumatically actuate the power tool 108. To facilitate forming electricity onboard the submersible vehicle 100 positioned on the seafloor S, the submersible vehicle 100 may include an oxygen supply 128 in fluid communication with the fuel cell 126 deliver oxygen to the fuel cell 126. For example, the oxygen supply 128 may include an oxygen candle, sometimes referred to as a chemical oxygen generator, chemically reactable to produce oxygen while the submersible vehicle 100 is submerged in water. As compared to the use of oxygen tanks, the use of an oxygen candle to supply oxygen to the fuel cell 126 may provide advantages with respect to size and overall energy efficiency of the submersible vehicle 100.

The oxygen from the oxygen supply 128 may react in the fuel cell 126 to generate electricity and, in turn, provide power to any one or more of various different electrically operable systems or components of the submersible vehicle 100. Given that the activated aluminum 122 is the source of the hydrogen used to operate the fuel cell 126 in this example, it shall be appreciated that the activated aluminum 122 may be used to electrically power various different aspects of the submersible vehicle 100. Given that the activated aluminum 122 is substantially solid (containing, in some cases, a small amount of activating material that may be in a two-phase mixture along grain boundaries of raw aluminum) and has a high energy density, it shall be further appreciated that the activated aluminum 122 is a volumetrically efficient mechanism for delivering hydrogen to depths associated with deep-sea mining or other underwater robotic activities (e.g., tending undersea oil wells) that are within the scope of the present disclosure. As compared to the use of hydrogen tanks with an equivalent amount of hydrogen, the volumetric efficiency of the activated aluminum 122 facilitates forming the submersible vehicle 100 with a smaller footprint that may be easier to handle on the surface, easier to submerge, and/or more less disruptive to an environment on the seafloor S.

In some implementations, the module 104 may facilitate carrying out one or more lifting processes associated with operation of the submersible vehicle 100 on the seafloor as part of a mining operation. For example, the module 104 may include a container 130 defining a payload volume 132, and the power tool 108 may be operable to move material from the seafloor S into the payload volume 132. Continuing with this example, the module 104 may additionally, or alternatively, include a lift structure 134 and a buoyancy volume 136. The valve assembly 112 may be actuatable to direct at least a portion hydrogen-containing gas onboard the submersible vehicle 100 into the buoyancy volume 136 of the lift structure 134. For example, the valve assembly 112 may be actuatable to direct hydrogen-containing gas into the buoyancy volume 136 from the reaction chamber 120. Additionally, or alternatively, as described in greater detail below, the valve assembly 112 may be actuatable to direct hydrogen-containing gas into the buoyancy volume 136 from the power tool 108.

In general, the buoyancy volume 136 may be sized to contain a volume of hydrogen sufficient to provide buoyancy force to lift to the ocean surface at least the module 104 from the seafloor S with the payload volume 132 of the module 104 fully laden with material M (e.g. nodules) collected from the seafloor S. In some instances, the buoyancy volume 136 may be sized to contain a volume of hydrogen sufficient to provide enough buoyancy force to lift the entirety of the submersible vehicle 100 to the ocean surface or to hold the entire submersible vehicle 100 neutrally buoyant. Thus, as may be appreciated from the foregoing, filling the buoyancy volume 136 with the hydrogen-containing gas may reduce and/or eliminate the need for a buoyancy engine (e.g., an electrically driven pump that pumps water from buoyancy tanks at significant energy expense) typically required to raise equipment for deep-sea mining and/or underwater robotic vehicle operations.

In some implementations, at least a portion of the lift structure 134 may be flexible to expand as pressure of hydrogen-containing gas changes within the buoyancy volume 136. For example, the lift structure 134 may be flexible to expand to accommodate at least a portion of the pressure change associated with decreasing depth of the module 104 as the lift structure 134 floats the module 104 alone, or in combination with one or more of the chassis 102, the drive system 106, or the power tool 108 toward the ocean surface. To facilitate forming the lift structure 134 using an efficient amount of flexible material, the module 104 may include a control valve 138 actuatable to control pressure of the hydrogen within the buoyancy volume 136 as the module 104 ascends to the ocean surface. For example, the control valve 138 may include a check valve actuatable, at a predetermined threshold pressure, to release at least a portion of the hydrogen-containing gas from the lift structure 134 as pressure in the buoyancy volume 136 increases with decreasing depth of the lift structure 134.

While the lift structure 134 may be advantageously formed to be flexible to facilitate forming the submersible vehicle 100 with a volumetrically efficient footprint, particularly in instances in which the lift structure 134 may be folded, it shall be appreciated that the formation of the lift structure 134 as rigid may have other benefits to the overall efficiency of a system that includes the submersible vehicle 100. For example, at least a portion of the lift structure 134 may be rigid to a predetermined depth associated with a mission of the submersible vehicle 100. In such implementations, the lift structure 134 may be initially filled with seawater, and the introduction of the hydrogen-containing gas into the buoyancy volume 136 displaces the seawater. For example, the lift structure 134 may include high-pressure carbon fiber containers (e.g., cylinders) that may be submerged with the submersible vehicle 100 with enough of the activated aluminum 122 in the reaction chamber 120 to raise at least the module 104 (and its payload of the material M collected from the seafloor) to the ocean surface. Given that the lift structure 134 is rigid in such instances, it shall be appreciated that raising the buoyancy volume 136 is also rigid and the hydrogen contained in the buoyancy volume 136 of the lift structure 134 becomes compressed as the lift structure 134 floats from the seafloor S to the ocean surface. Thus, as described in greater detail below, the lift structure 134 that has been used to raise at least the module 104 to the ocean surface may be a source of compressed hydrogen usable, for example, to power the surface ship used to deliver equipment including the submersible vehicle 100 and/or additional instances of the module 104 to a mining site on the surface floor S.

Having described various uses of on-board generated hydrogen for providing replenishable power to the submersible vehicle 100 and/or carrying out one or more lifting processes during use of the submersible vehicle 100, attention is now directed to the use of on-board generated hydrogen for providing pneumatic actuation useful for collecting the material M from the seafloor S.

The valve assembly 112 may be arranged, in some instances, to direct a least a portion of the hydrogen-containing gas from (e.g., from the reaction chamber 120) to the power tool 108. The hydrogen-containing gas may be used, for example, for pneumatic actuation of the power tool 108. Advantageously, following use of the hydrogen-containing fuel for pneumatic actuation of the power tool 108, the valve assembly 112 may direct the hydrogen-containing fuel to the electric power supply 114 in instances in which the electric power supply 114 includes a fuel cell. That is, a given quantity hydrogen-containing gas generated by the activated aluminum 122 may be used to carry out a plurality of operations onboard the submersible vehicle 100, with the order use of the given quantity of hydrogen containing determined according to efficiency. As an example, in instances in which the hydrogen containing gas is directed to the power tool 108 for pneumatic actuation, it shall be appreciated that this may be more a more efficient form of actuation than directing the hydrogen-containing fuel to the electric power supply 114 to form electricity deliverable to the power tool 108 for electrical actuation of the power tool 108.

As an example, the power tool 108 may include an accumulator 140, one or more instance of a pneumatic actuator 142, and an end-effector 144 (e.g., a claw). In such instances, the valve assembly 112 may be actuatable to direct at least a portion of the hydrogen-containing gas from the reaction chamber 120 to the accumulator 140, where heat produced by the formation of hydrogen from activated aluminum is useful for pressurization. Each of the one or more instances of the pneumatic actuator 142 may be actuatable, via the hydrogen-containing gas from the accumulator 140, to move one or more instances of the pneumatic actuator 142 from a first position to a second position to move the end-effector 144. Further, or instead, each instance of the pneumatic actuator 142 may be retractable from the second position to the first position (e.g., through the use of a spring or other similar return mechanism). At least a portion of the hydrogen-containing gas may be then be movable to the module 104 via retraction of each instance of the pneumatic actuator 142 from the second position to the first position. That is, once used for pneumatic actuation, the hydrogen-containing gas may be directed to the electric power supply 114 of the module 104 in instances in which the electric power supply 114 includes the fuel cell 126 and/or the hydrogen-containing gas may be directed to the buoyancy volume 136 of the lift structure 134 to carry out any one or more of the various different lift operations described herein.

While the power tool 108 has been described as being pneumatically actuated by hydrogen generated from the activated aluminum 122 reacting with seawater in the reaction chamber 120, it shall be appreciated that other types of actuation of the power tool 108 may be additionally or alternatively used. For example, the power tool 108 may additionally, or alternatively, be in electrical communication with the electric power supply and electrically operable (e.g., including power electronics and electrical actuators), such as may be useful for carrying out certain types of motion that may not be easily performed using only pneumatic actuation.

In general, the drive system 106 may be operable to maneuver the submersible vehicle 100 according to any one or more modes of movement useful for position the submersible vehicle 100 relative to the seafloor S such that the power tool 108 may extend to reach the seafloor S to collect the material M. Thus, for example, in some instances, the propulsion system 118 may include a wheel driven track set. Additionally, or alternatively, the propulsion system 118 may include one or more propellers to facilitate hovering the submersible vehicle 100 above the seafloor S, such as may be useful for maneuvering over soft sediment and/or delicate environments. Further, or instead, the propulsion system 118 may be in electrical communication with the electric power supply 114 such that the propulsion system 118 is at least partially powered using electricity. In certain instances, the propulsion system 118 may be a least partially pneumatically driven, and the valve assembly 112 may be actuatable to direct a least a portion of the pressurized hydrogen-containing gas (formed from the generation of heat and hydrogen in the reaction chamber 120 as the activated aluminum 122 reacts with water) from the reaction chamber 120 to the propulsion system 118.

In general, the chassis 102 may include a loadbearing framework on which one or more of various different elements of the submersible vehicle 100 may be supported (e.g., mechanically coupled) in a predetermined orientation relative to one another to operate in coordination with one another according to any one or more of the various different aspects of vehicle operation described herein. In certain implementations, the chassis 102 may form a watertight seal around any one or more of various different portions of the elements supported thereon to protect such elements from damage or unintended degradation that may result from exposure to saltwater. Further, or instead, the chassis 102 may be formed of one or more materials sized and shaped to withstand deformation at depths associated with deep-sea mining (e.g., water depths of greater than about 1000 m and less than about 7000 m). Additionally, or alternatively, to the extent one or more elements supported on the chassis 102 are pressure-sensitive at ocean depths associated with excursions of the submersible vehicle 100, it shall be generally understood that the chassis 102 may be shaped to house any one or more of such elements in a pressurized chamber to reduce the likelihood of damage to such elements.

In certain instances, the submersible vehicle 100 may include a controller 146 carried on the chassis 102. The controller 146 may include a processing unit 147 and a non-transitory, computer-readable storage medium 148 having stored thereon computer-readable instructions for causing the processing unit 147 to carry out any one or more of the various different techniques described herein, such as actuation of the valve assembly 112 to direct the hydrogen-containing gas according to any one or more of the various different examples described herein. For example, the instructions stored on the non-transitory, computer-readable storage medium 148 may include instructions for causing the processing unit 147 to actuate the valve assembly to direct the hydrogen-containing gas to the lift structure 134. Such actuation may be base, for example, on one or more of time, an amount of the material M in the payload volume 132, or an amount of the activated aluminum 122 carried by the reactor 110. Additionally, or alternatively, the instructions may cause the processing unit 147 to determine an inflation state of the lift structure 134 (e.g., based on a calculation according depth, temperature, and time and/or based on feedback from the control valve 138). Further, or instead, the instructions may cause the processing unit 147 to release the module 104 from the chassis 102 based on the inflation state of the lift structure 134. For example, in some instances, releasing the module 104 may be further based on an amount of the activated aluminum 122 that remains unreacted in the reaction chamber 120.

In certain instances, the reactor 110 and/or the oxygen supply 128 may be releasable from the chassis 102 along the seafloor S, such as may be useful for reducing the amount of mass required to be lifted from the seafloor S. Thus, continuing with this example, the non-transitory, computer-readable storage medium 148 may additionally, or alternatively, have stored thereon computer-readable instructions for causing the processing unit 147 to perform operations further including releasing the reactor 110 and/or the oxygen supply 128 from the chassis 102 along the seafloor S to lift the remainder of the submersible vehicle 100 (e.g., the module 104, the chassis 102, the drive system 106, and the power tool 108) from the seafloor S with the lift structure 134 in an inflated state.

Having described aspects of a submersible vehicle including a module carried on a chassis, attention is now directed to implementations in which a module may sit on the seafloor and a submersible vehicle may deposit collected material into one or more such modules. As each module becomes full of collected material, the respective module may be lifted to the ocean surface according to any one or more of the various different techniques described herein.

Figure 2A:
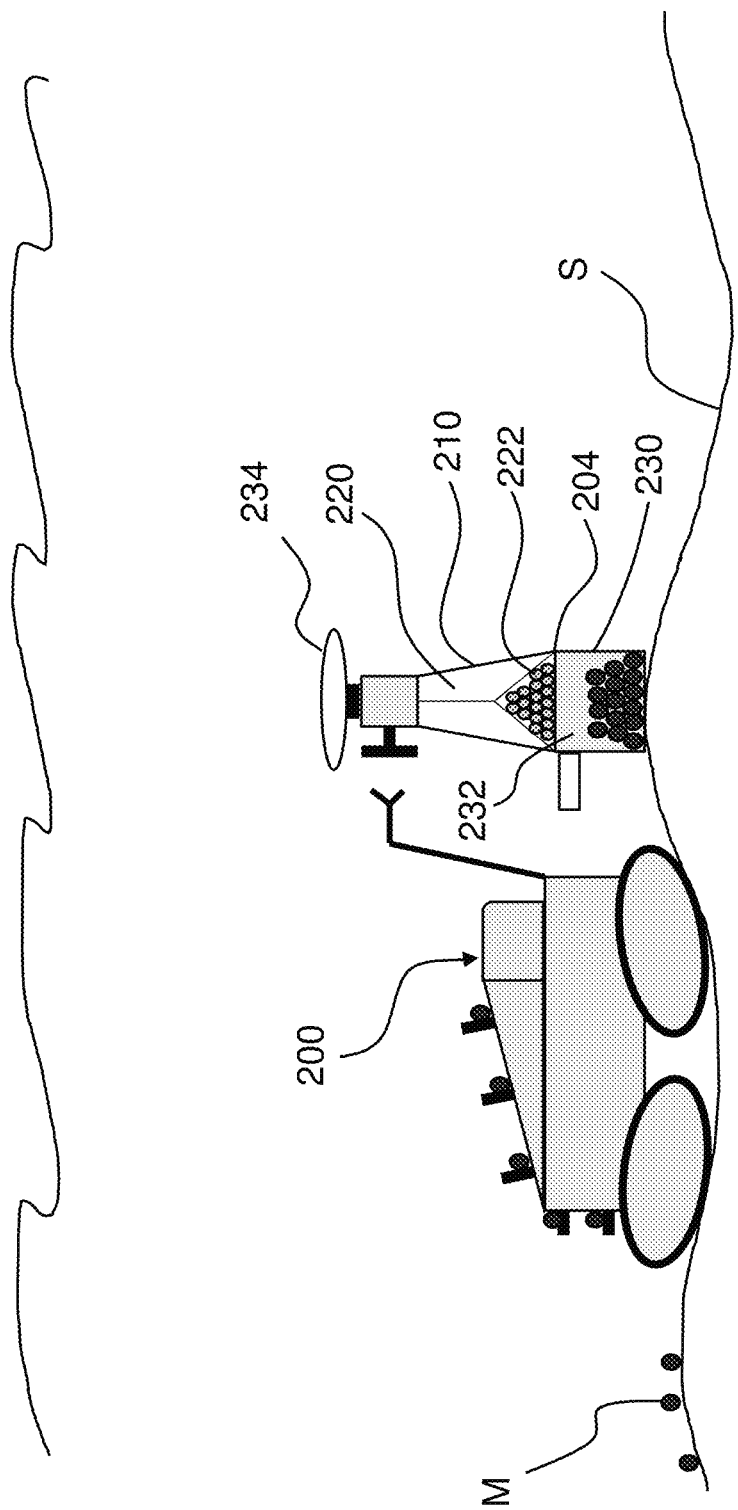
FIG. 2A is a schematic representation of a system including a submersible vehicle and a module, the module including a reaction chamber and a lifting structure, and the module shown resting on the seafloor.
Figure 2B:
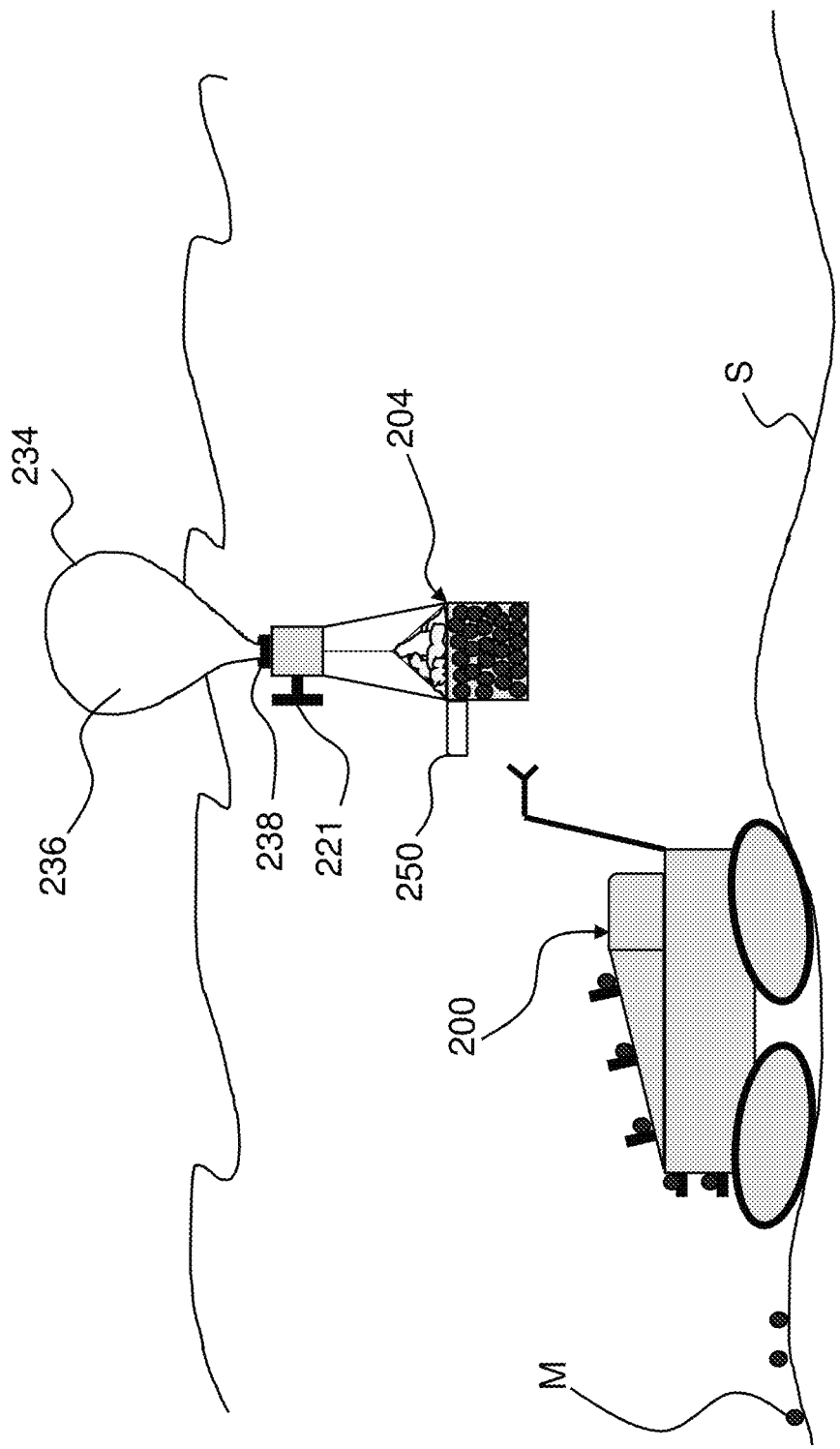
FIG. 2B is a schematic representation of the system of FIG. 2A, shown with the lifting structure of the module filled with a lifting gas from the reaction chamber and raised above the seafloor under buoyancy force.

Referring now to FIGS. 2A and 2B, a module 204 may be submersible (e.g., under its own weight) to the seafloor S, where a submersible vehicle 200 may navigate to the module 204 to deposit the material M collected by the submersible vehicle 200. The module 204 may include a container 230, a lift structure 234, a reactor 210, and an inlet valve 221. The container 230 may define a payload volume 232. The lift structure 234 may be coupled to the container 230 and may, further or instead, define a buoyancy volume 236. The reactor 210 may be coupled to the container 230, and the reactor 210 may define a reaction chamber 220 in fluid communication with the buoyancy volume 236. The inlet valve 221 may be in fluid communication with the reaction chamber 220 and actuatable to introduce seawater into the reaction chamber 220 in response to a command (e.g., via an onboard controller and/or via remote actuation) to fill the buoyancy volume 236 with a lifting gas (e.g., a hydrogen-containing gas formed by the reaction of seawater with activated aluminum 222 in the reaction chamber 220).

In certain implementations, the container 230 may define an opening 250 to receive the material M, from the submersible vehicle 200, into the payload volume 232. That is, the submersible vehicle 200 may navigate to the module 204, and a power tool 208 of the submersible vehicle 200 may lift, shovel, or otherwise move the material M into the payload volume 232 via the opening 250 of the container 230.

To facilitate lifting the module 204 using the least amount of hydrogen-containing gas—and, thus, the least amount of activated aluminum 122—the reactor 210 may be releasable from the container 230 and the lift structure 234 such that inflation of the buoyancy volume 236 of the lift structure 234 lifts only the container 230 and the material M in the payload volume. In certain instances, the reactor 210 may be releasable from the container 230 and the lift structure 234 based on a state of inflation of the buoyancy volume 236. That is, once full inflation of the buoyancy volume 236 is detected (e.g., based on a control valve 238 on the lift structure 234 and in fluid communication with the buoyancy volume 236), the reactor 210 and its contents may be jettisoned. The contents of the reactor 210 are non-toxic and safe for the environment, containing only reaction byproducts and/or unreacted amounts of the activated aluminum 222.

While the buoyancy volume 236 is shown as a single volume, it shall be appreciated that this is the for sake of clarity of illustration and explanation. Unless otherwise specified or made clear from the context, the buoyancy volume 236 may be distributed about the container 230 in any one or more of various different arrangements as may be useful for lifting the container 230 in an orientation controlled to reduce the likelihood of inadvertently spilling the material M in the payload volume 232 of the container 230. Thus, for example, the buoyancy volume 236 may include a plurality of discrete volumes distributed about the container 230.

In general, the lift structure 234 may include any one or more of the various different lift structures described herein. Accordingly, in some implementations, the lift structure 234 defining the buoyancy volume may include at least one tank rigid to a predetermined depth of water (e.g., rigid to at least the depth of the seafloor S). Thus, as the lift structure 234 brings the container 230 to the ocean surface, the lift structure 234 may be filled with pressurized hydrogen usable in any one or more of various different applications onboard a surface ship and/or on land.

Having described various different aspects of submersible vehicles and modules that may be used in coordination with submersible vehicles for collecting material from the seafloor, attention is directed now to a system operable to deliver a plurality of modules and at least one submersible vehicles to the seafloor and to retrieve such equipment, laden with collected material, from the ocean surface.

Figure 3A:
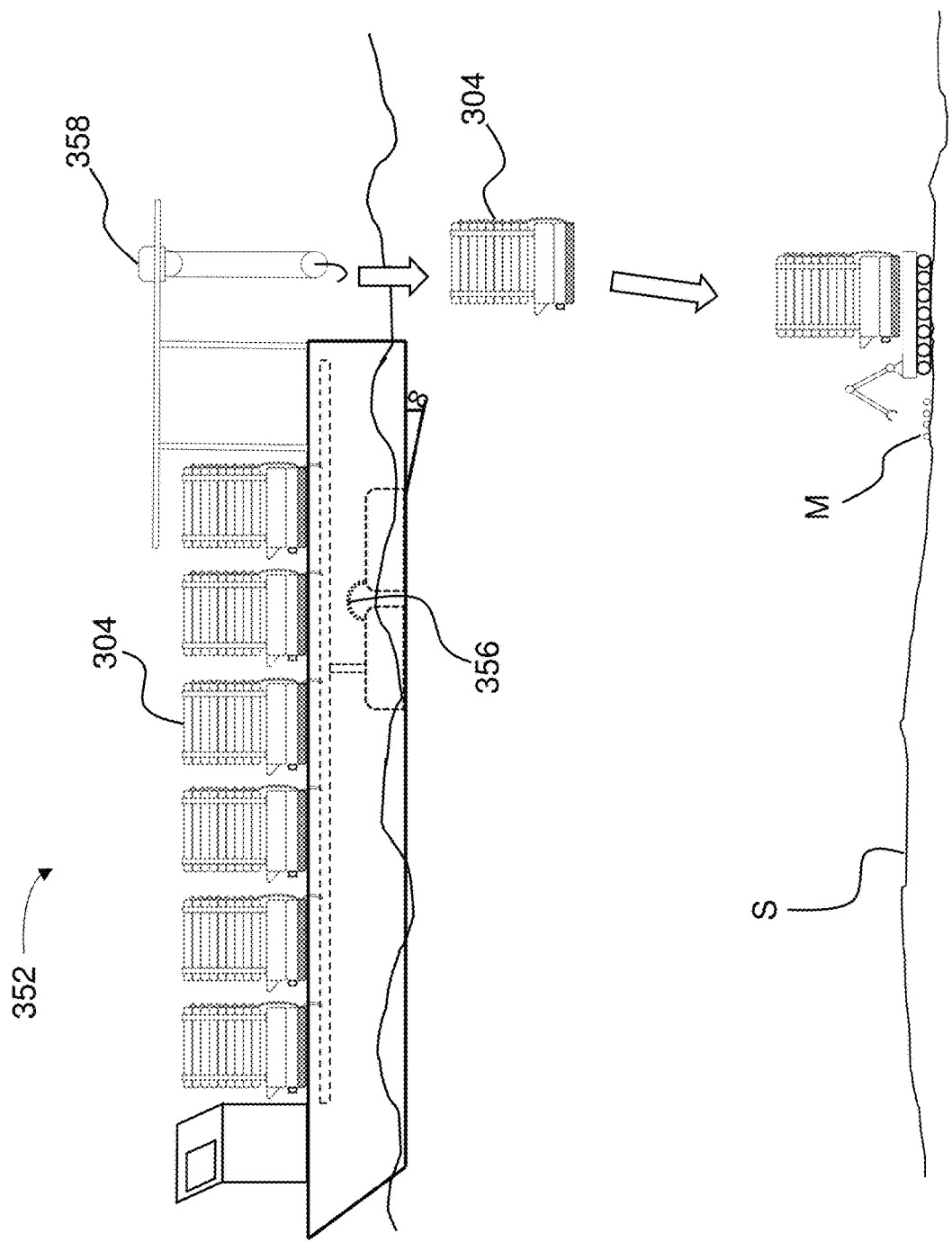
FIG. 3A is a schematic representation of a system including a surface ship a plurality of modules carried on the surface ship, and a submersible vehicle, the surface ship shown deploying modules toward the submersible vehicle on the seafloor.
Figure 3B:
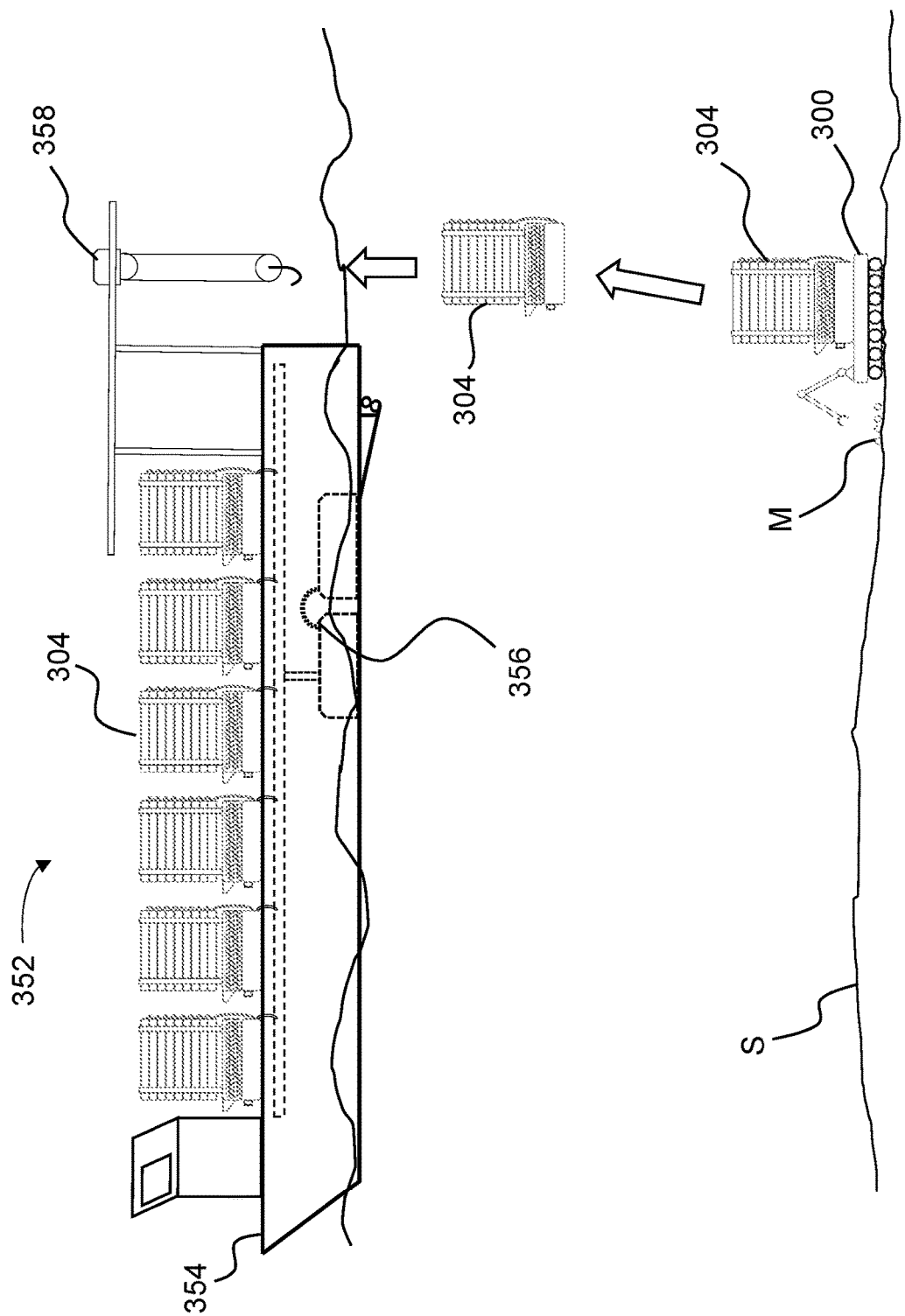
FIG. 3B is a schematic representation of the system of FIG. 3A, shown with the modules being retrieved from the seafloor surface ship under buoyancy force.

Referring now to FIGS. 3A-3C, a system 352 may include a surface ship 354, a plurality of modules 304 carried on the surface ship 354 (e.g., on the surface of the ship), and a submersible vehicle 300 deployable from the surface ship 354 and operable to collect the material M from the seafloor S according to any one or more of the various different techniques described herein.

In general, the surface ship 354 may include a power plant 356 operable using hydrogen. For example, the power plant 356 may include an internal combustion engine operable using hydrogen. Further, or instead, the power plant 356 may include one or more fuel cells operable to generate electricity to power all or a portion of the surface ship 354 as the surface ship 354 sails from shore to the mining site and returns from the mining site to shore, with the material M. Each instance of the module 304 may be submersible to the seafloor S and may additionally or alternatively include a container 330, at least one instance of a lift structure 334, and a reactor 310. The container 330 may define a payload volume 332. In use, the submersible vehicle 300 may dock with one or more instances of the module 304 at a time to facilitate moving the material M into the payload volume 332 and to receive power from hydrogen-containing gas generatable from reaction of seawater and activated aluminum 322 in a reaction chamber 320 defined by the reactor 310. In this context, power deliverable from the module 304 to the submersible vehicle 300 may include any one or more of various different types of electrical and/or pneumatic power described herein. Thus, for example, a portion of the activated aluminum 322 in the reaction chamber 320 may generate hydrogen-containing gas useable in a fuel cell carried on the submersible vehicle 300 to power any one or more of various different types of components described herein. Once a given instance of the module 304 is full of the material M collected from the seafloor S and placed into the payload volume 332 by the submersible vehicle 300, the submersible vehicle 300 may detach from the module 304 and attach to another instance of the module 304, which may recharge the submersible vehicle 300 and/or provide space for collecting the material M from the seafloor S.

In general, each instance of the module 304 may be lifted to the ocean surface for collection by the surface ship 354 according to any one or more of the various different techniques described herein. For example, the reactor 310 may be coupled to the container 330 such that hydrogen-containing gas produced by the reaction of seawater and activated aluminum 322 in the reaction chamber 320 defined by the reactor 310 may be directed to the lift structure 334 coupled to the container 330. To facilitate efficient use of the activated aluminum 322 for lifting the container 330, reaction byproduct from the reaction forming the hydrogen-containing gas in the reaction chamber 320 may be dumped from the reaction chamber 320 prior to lifting the module 304 from the seafloor S and/or as the module 304 is ascending from the seafloor S.

The hydrogen-containing gas in the lift structure 334 may impart buoyancy to the container 330 and, ultimately, lift the container 330 and the material M in the payload volume 332. In particular, the lift structure 334 may include at least one tank that is rigid to a predetermined depth greater than a depth of the mining operation such that the at least one tank remains rigid. More specifically, the lift structure 334 may remain rigid upon descent from the surface ship 354 to the seafloor S and, importantly, the lift structure 334 may remain rigid hydrogen becomes pressurized in the lift structure 334 as the lift structure 334 lifts the container 330 (e.g., with the payload volume 332 laden with the material M) from the seafloor S to the ocean surface.

At the ocean surface, the surface ship 354 may collect each instance of the module 304 using, for example, a crane 358. As shall be appreciated, each instance of the module 304 raised to the ocean surface according to the foregoing example may include two different materials that are critical to the economic viability of any given deep-sea mining operation. Specifically, each instance of the module 304 may be laden with the material M, and the lift structure 334 may be filled with pressurized hydrogen (generated when the module 304 was on the seafloor S and pressurized as the module 304 was lifted with the lift structure 334 including rigid material) having additional uses on the surface and/or as part of future mining operations. For example, each instance of the lift structure 334 may be connectable in fluid communication with the power plant 356 of the surface ship 354. That is, the same hydrogen used to lift the module 304 may be used to propel the surface ship 354 toward shore to deliver the material M. As compared to processes requiring different materials for such lifting and propulsion functions, it shall be appreciated that the system 352 may offer significant benefits related to the economic viability of collecting the material M from the seafloor S.

If the empty mass of the module 304 is taken into account (e.g., the mass of the lift structure 334, the container 330, and the mass of the activated aluminum 322 and hydrogen gas itself, an additional amount of the activated aluminum 322 over that to simply raise the material M is needed to generate hydrogen gas to lift the module 304. If more mass is added, more hydrogen is needed to raise that mass which in turn adds mass to the module 304 (e.g., as a result of needing more tanks for the lifting structure 334 to store that mass). The total mass of the module 304 may be calculated, however, by knowing the unit lifting capacity of hydrogen at depth, the mass of the lift structure 334 (e.g., high-pressure cylinders) needed to hold a certain volume of hydrogen, and the mass of the module 304 itself excluding the lift structure 334. For the sake of this analysis, the mass of the module 304 excluding the lift structure 334 (referred to as an ancillary mass, $m_{ancillary}$) may be estimated based on known ratios for payload-to-container weight used in the mining industry for example. The mass of the lift structure 334 may be calculated by considering the yield strength of the rigid material used to form the lift structure 334, the pressure the lift structure 334 will experience, and the desired diameter and length of tanks of the lift structure 334. The minimum wall thickness needed to structurally hold in the pressurized hydrogen at the surface in the lift structure 334 can then be determined. Thus, the total mass of the module 304, including the material M collected from the seafloor S, mass of the lift structure 334, and ancillary mass can be determined by the following equation, useful for sizing each instance of the module 304 of the plurality of the modules 304 and the surface ship 354 used to transport such:

$$m_{module} = \frac{m_{ore}}{1 - \frac{mass_{tank}}{m_{H2-raise}} - \frac{m_{ancillary}}{m_{ore}}}$$

where $m_{odule}$ is the total mass of the module 304 laden with the material M, $m_{ore}$ is the mass of the material M, $m_{tank}$ is the mass of the lift structure 334, $m_{ancillary}$ is as defined above, and $m_{H2-raise}$ is the mass of hydrogen required to raise the module 304 in a full laden state.

As shown in Table 1, the surface ship 354 may leave port with a sufficient amount of the activated aluminum 322 to raise the material M (approximately 80% of the weight of the material M that will be collected). Thus, the surface ship 354 may consume nearly the same amount of fuel heading out of port as it will getting back to port. The lift structure 334 may be formed of carbon fiber. To raise a single ton of the material M (e.g., ore) from the sea floor S, the gross mass of the module 304 may about 1600 kg, which includes the mass of the material M. In addition to this, about 520 kg of the activated aluminum 322 may be required to generate sufficient hydrogen to lift the gross mass of the module 304. As also shown in Table 1, the surface ship 354 may be an 8000 TEU (twenty-foot equivalent unit) vessel can haul approximately 25,000 tons of material (ore, tanks, and machines). Using this mass, the total amount of the activated aluminum 322 required to generate sufficient gas to raise as much mass from the sea floor will generate enough hydrogen gas to power the surface ship 354 for 185 days, assuming the vessel consumes 150 tons of bunker fuel per day. For a 1000 mile long mission at 20 knots, it will take the ship approximately 100 hours round trip to go to and from the destination. Leaving approximately 181 days to operate the modules 304 and/or the submersible vehicle 300 to fill the modules 304. Any remaining hydrogen gas can either be sold once back in port, or used for future missions. Thus, as may be appreciated from the foregoing analysis, the system 352 is well-balanced for renewable symbiotic operation with renewable energy systems (e.g., the power plant 356 including a fuel cell) and shore-based aluminum scrap used to form the activated aluminum 322.

Table 1 below shows an exemplary calculation for sizing the system 352. Table 1 includes exemplary formulas and/or quantities that are based, in some cases, on various assumptions and should not be considered limiting or in any way required for any particular aspect of the systems, modules, and submersible vehicles described herein. Rather, of particular importance in Table 1 is the symbiotic result that the hydrogen generated to raise the plurality of modules 304 may provide enough energy to power the surface ship 354 back to shore to transfer the material M and then refresh the plurality of modules 304 with the new quantities of the activated aluminum 322, and then power the surface ship 354 back to the mining site for collecting its next load the material M. This resource efficiency is advantageous to the economic operation of the ore mining effort. At a depth of 4000 m, 1 g of aluminum will generate 0.11 g of hydrogen gas when reacted with water, will have a density of 35.95 g/L at depth. In the example calculation of Table 1 below, ore is assumed to have a density of 8 g/mL due to the high concentrations of copper. To determine how much of the activated aluminum 322 is required per gram of the material M, the amount of hydrogen needed to lift the module 304 at a certain depth must be determined. As an example, at 4000 m, 332 kg of the activated aluminum 322 may generate enough hydrogen gas by reacting with surrounding seawater to lift a single metric ton of the material M. When the material M is brought to the surface with high high-pressure hydrogen in the lifting structure 334, the hydrogen in the lifting structure 334 can be used for the power plant 356 to power the surface ship 354 and/or burned in internal combustion engines to power the ship so the surface ship 354 to displace the use of Diesel fuel.

TABLE 1

Exemplary calculation for sizing a system including a ship carrying a plurality of modules according to certain embodiments.

| Parameter | Value | Units | Symbol | Equation |
|---|---|---|---|---|
| System Operation | | | | |
| Depth of Operation | 4000 | m | d | |
| Mass of Ore to be lifted | 1000 | kg | m_ore | |
| Density of H2 at STP | 0.09 | g/L | rho_stp | |
| Density of H2 at depth | 35.95 | g/L | rhod | _=rho_stp * d/10 |
| Density of Water (seawater) | 1029 | kg/m^3 | rhow | |
| Activated Aluminum Fuel and Hydrogen | | | | |
| Volume of Hydrogen Generated by 1 g Al at STP | 1.25 | L | VH2STP | |
| Volume of Hydrogen generated by 1 g Al at depth | 0.003 | L | VH2D | _=VH2STP/(d/10) |
| Bouyant Force of H2 from 1 g Al at depth | 0.03 | N | bfource | _=VH2D/1000 * rhow * 9.8 − VH2D/1000 * rhod * 9.8 |
| Mass of Al required to lift 1 ton of ore at depth | 322 | kg | m_al | _=m_ore * 9.8/(bforce * 1000) |
| Mass of H2 generated from 1 kg of Al | 0.112 | kg/kg | H2_alum | |

TABLE 1-continued

Exemplary calculation for sizing a system including a ship carrying a plurality of modules according to certain embodiments.

| Parameter | Value | Units | Symbol | Equation |
|---|---|---|---|---|
| Mass of H2 needed to raise 1 ton of ore at depth | 36 | kg/ton | m_H2 | _=m_al * H2_alum |
| Volume of H2 to raise 1 kg of load | 0.0010 | m^3/kg | VH2_pld | _=(1/rhow) * (1 + rhod/1000) |
| Energy | | | | |
| Energy Density of H2 (LHV) for ICE | 119.93 | MJ/kg | H2LHV | |
| Energy Density of H2 (HHV) for Fuel Cell | 141.86 | MJ/kg | H2HHV | |
| Compressed H2 energy stored per 1 Ton of Ore Raised (LHV) | 39 | GJ | E_LHV | _=H2LHV * m_al/1000 |
| Compressed H2 energy per 1 Ton of Ore Raised (HHV) | 46 | GJ | E_HHV | _=H2HHV * m_al/1000 |
| Conventional ship ICE Bunker Fuel Energy Density | 40.1 | MJ/kg | Bunker_EngD | |
| Equivalent Bunker Fuel Generated by H2 per ton of Ore Raised | 108 | kg | Bunk_eqvgen | _=m_h2 * H2LHV/Bunker_EngD |
| Surface Vessel | | | | |
| reference container ship size | 8,000 | TEU | Ship_size | (20' eqvlnt unit) |
| Approximate net mass of TEU (ore in TEU) | 20,000 | kg | TEU_Mass | |
| Mass of ore nodules per ship | 2.58E+08 | kg | m_oreship | _=TEU_mass * Ship_size * m_systemgross/1000 |
| Total Aluminum needed to lift ore for ship | 1.34E+08 | kg | AAFtot | _=m_al_total/m_ore * m_oreship |
| H2 generated to fill ship with ore | 2.79E+07 | kg | m_H2ship | _=m_oreship/1000 * Bunk_eqvgen |
| Conventional 8000 TEU Container ship bunker fuel/day cruising | 150,000 | kg | m_fuelcons | |
| Equivalent days of ship travel from H2 High Pressure Bouyancy tanks | 186 | | m_fuelship | _=m_H2ship/m_fuelcons |
| Outer Diameter of Tank | 0.5 | m | OD_tank | |
| length of tank | 3 | m | L_tank | |
| allowable wall stress | 1000 | Mpa | sig_max | |
| Pressure at depth | 40000000 | Pa | P_tank | _=d/10 * 10^5 |
| Required wall thickness | 0.01 | m | t_tank | _=P_tank * OD_tank(2 * sig_max * 10^6) |
| density of tank material | 2000 | kg/m^3 | rho_tank | |
| Volume of tank | 0.60 | m^3 | V_tank | _=4/3 * PI( ) * ((OD_tank – 2 * t_tank)/2)^3 + L_tank * PI( ) * (OD_tank – 2 * t_tank)^2/4 |
| Volume of tank material | 0.05 | m^3 | v_tankwall | _=(4/3 * PI( ) * ((OD_tank)/2)^3 + L_tank * PI( ) * (OD_tank)^2/4) – B36 |
| Mass of tank | 107 | kg | m_tank | _=v_tankwall * rho_tank |
| Mass of hydrogen tank per cubic meter of H2 | 179 | kg/m^3 | m_tankton | _=m_tank/V_tank |
| Mass of hydrogen tank per kg raised | 0.180 | kg/kg | mtank_mpld | _=m_tankton * VH2_pld |
| System Mass | | | | |
| Ratio of ancillary machine weight to raised ore mass | 0.2 | kg/kg | ratio_machine | |
| Gross System Mass | 1613 | kg | m_systemgross | _=m_ore/(1 – ratio_machine – mtank_mpld) |
| Empty Weight of Machine | 613 | kg | m_systemempty | _=m_systemgross – m_ore |

TABLE 1-continued

Exemplary calculation for sizing a system including a ship carrying a plurality of modules according to certain embodiments.

| Parameter | Value | Units | Symbol | Equation |
|---|---|---|---|---|
| Mass of Aluminum needed to raise ore and machine | 520 | | m_al_total | _=(ratio_machine + 1) * m_al |

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A submersible vehicle comprising:
a chassis;
a module supported on the chassis, the module including an electric power supply;
a drive system supported on the chassis, the drive system including a battery, and a propulsion assembly, the battery in electrical communication with the electric power supply and the propulsion assembly, and the propulsion assembly operable to locate the chassis relative to a seafloor;
a power tool coupled to the chassis, the power tool operable to collect material from the seafloor;
a reactor supported on the chassis, the reactor defining a reaction chamber; and
a valve assembly actuatable to move a hydrogen-containing gas from the reaction chamber and direct the hydrogen-containing gas to one or more of the electric power supply or the power tool.

2. The submersible vehicle of claim 1, wherein the electric power supply includes a chemical battery.

3. The submersible vehicle of claim 1, further comprising an oxygen supply, wherein the electric power supply includes a fuel cell arranged to receive oxygen from the oxygen supply.

4. The submersible vehicle of claim 3, wherein the valve assembly is arranged to direct at least a portion of the hydrogen-containing gas to the fuel cell.

5. The submersible vehicle of claim 3, wherein the valve assembly is arranged to direct at least a portion of the hydrogen-containing gas to the power tool.

6. The submersible vehicle of claim 3, wherein the oxygen supply includes an oxygen candle.

7. The submersible vehicle of claim 1, wherein the power tool includes power electronics and electric actuators in electrical communication with the electric power supply of the module.

8. The submersible vehicle of claim 1, wherein the valve assembly is arranged to direct at least a portion of the hydrogen-containing gas to the to the electric power supply via the power tool.

9. The submersible vehicle of claim 8, wherein the power tool includes an accumulator, one or more pneumatic actuator, and an end-effector, the valve assembly is actuatable to direct at least a portion of the hydrogen-containing gas from the reaction chamber to the accumulator, and each of the one or more pneumatic actuators is actuatable, via the hydrogen-containing gas from the accumulator, from a first position to a second position to move the end-effector.

10. The submersible vehicle of claim 9, wherein each pneumatic actuator is retractable from the second position to the first position, and at least a portion of the hydrogen-containing gas is movable to the module via retraction of each pneumatic actuator from the second position to the first position.

11. The submersible vehicle of claim 1, wherein the reactor includes an inlet valve actuatable to control a flow of seawater into the reaction chamber.

12. The submersible vehicle of claim 1, wherein the propulsion assembly includes one or more of a wheel-driven track set or a propeller.

13. The submersible vehicle of claim 1, wherein the module includes a container defining a payload volume, and the power tool is operable to move material from the seafloor into the payload volume.

14. The submersible vehicle of claim 13, wherein the module further includes a lift structure defining a buoyancy volume, wherein the valve assembly is actuatable to direct at least a portion of the hydrogen-containing gas into the buoyancy volume from the reaction chamber, the power tool, or both.

15. The submersible vehicle of claim 14, wherein at least a portion of the lift structure is flexible to expand as pressure of hydrogen-containing gas therein changes with decreasing depth as buoyancy of the lift structure raises the module alone or in combination with one or more of the chassis, the drive system, or the power tool.

16. The submersible vehicle of claim 14, wherein the module includes a control valve in fluid communication with the buoyancy volume and actuatable, at a predetermined threshold pressure, to release at least a portion of the hydrogen-containing gas from the lift structure as pressure in the buoyancy volume increases with decreasing depth of the lift structure.

17. The submersible vehicle of claim 14, wherein at least a portion of the lift structure is rigid to a predetermined depth associated with a mission of the submersible vehicle.

18. The submersible vehicle of claim 17, wherein at least a portion of the lift structure includes carbon fiber.

19. The submersible vehicle of claim 14, further comprising a controller including a processing unit and a non-transitory computer-readable storage media having stored thereon computer-readable instructions for causing the processing unit to perform operations including
actuating the valve assembly to direct the hydrogen-containing gas to the lift structure,
determining an inflation state of the lift structure, and
releasing the module from the chassis based on the inflation state of the lift structure.

20. The submersible vehicle of claim 19, wherein actuating the valve assembly to direct the hydrogen-containing gas to the lift structure is based one or more of time, an amount of material in the payload volume, or an amount of water-reactive aluminum carried by the reactor.

21. The submersible vehicle of claim 19, wherein releasing the module is further based on an amount of unreacted activated aluminum in the reaction chamber.

22. The submersible vehicle of claim 19, wherein the controller has further stored thereon computer-readable instructions for causing the processing unit to perform operations further including releasing the reactor from the chassis along the seafloor to lift the module, the chassis, the drive system, and the power tool from the seafloor with the lift structure in an inflated state.

* * * * *